Aug. 11, 1953
H. A. KNOLLMAN
2,648,827
ELECTRICAL SOCKET CONNECTOR
FORMED BY ALTERNATE BANDS
Filed Jan. 19, 1952
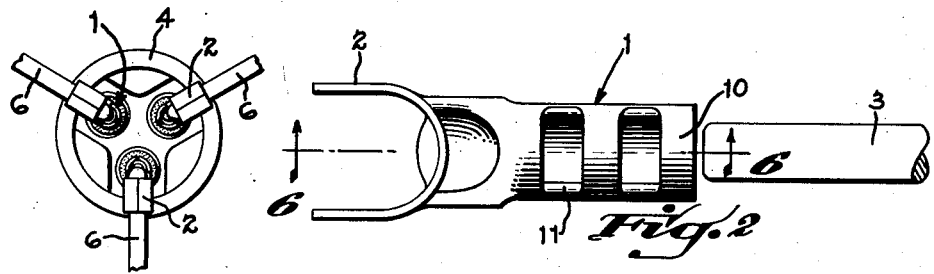
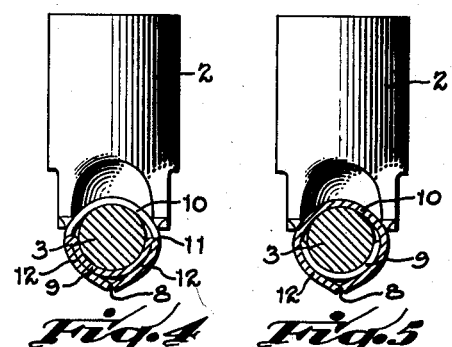
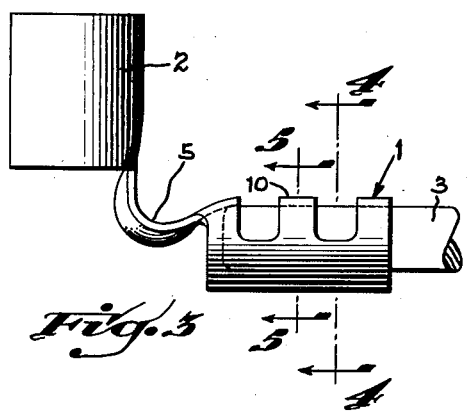
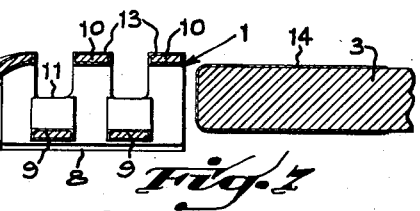
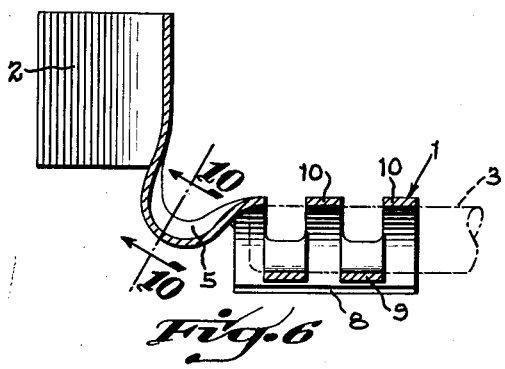
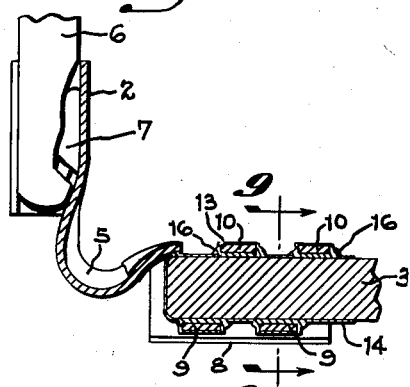
INVENTOR.
Harry A. Knollman.
BY
Wood, Herron & Evans.
ATTORNEYS.

Patented Aug. 11, 1953

UNITED STATES PATENT OFFICE 2,648,827

2,648,827
ELECTRICAL SOCKET CONNECTOR FORMED BY ALTERNATE BANDS

Harry A. Knollman, Mount Orab, Ohio, assignor to a partnership composed of Fred G. Krueger and Fred H. Hudepohl, doing business as Krueger and Hudepohl, Cincinnati, Ohio Application January 19, 1952, Serial No. 267,225

5 Claims. (Cl. 339—256)

This invention is directed to a connector arranged to be secured upon the end of a lead wire to provide an electrical connection from the wire to a terminal post. More particularly, the connector is intended to be utilized in attaching electric lead wires to the internal terminal posts of hermetically sealed refrigerator compressors to provide permanent internal connections from the terminal posts to the electric motor which is enclosed within the sealed unit. The present connectors are also intended to be applied to the external terminal posts of the unit to conduct the electrical energy from the power source to the unit.

The compressor units, which are presently used in household refrigerators, consist generally of a sheet metal housing enclosing the compressor motor, pump and other component parts. These parts are permanently sealed within the unit with the refrigerant; consequently, the electrical energy for driving the motor must be passed through the wall of the housing to the motor. For this purpose, hermetic seal plugs, having insulated electrical terminal posts, are welded or otherwise sealed in an opening formed in the wall of the housing. The terminal posts pass through the plug and extend outwardly from opposite sides of it and are sealed in the plug by an insulating material. Thus, the posts are mounted rigidly by the insulating material and their opposite ends are accessible for application of the lead wires both internally and externally of the casing.

The housing of the compressor unit is made up of separate sections and the electrical wires extending from the electrical components within the housing are attached to the inner ends of the terminal posts before the sections are assembled. After the wires are attached, and the other parts assembled, the housing sections are welded permanently together and the unit is ready to be placed in service.

Operation of the compressor unit gives rise to a great deal of vibration tending to loosen and dislodge the electrical connectors. Since failure of the connectors requires the replacement of the sealed compressor unit or at least an expensive repair job, it is imperative that permanent, reliable connections be made. Even rotary looseness of the connectors upon their terminal posts is serious since the connectors may come into contact with one another and short circuit the electrical system.

The conventional practice in the past has been to utilize a connector which establishes a frictional engagement with the terminal post in order that the lead wire connections may be made quickly and easily. The terminal posts are closely spaced, making this type of connection the most convenient and practical for rapid assembly techniques. Recognizing the possibility of dislodgement of the connectors, the more recent practice has been to provide a groove in the terminal post and to provide a cooperating locking element in the connector adapted to establish snap fit with the groove. If this connector is properly applied, there is practically no chance of it shaking loose from the post; however, the connectors are not locked positively against rotation upon their posts. Thus it is possible for connectors of this type to shift into contact with one another and thereby short circuit the electrical system.

A soldered connection of the wires to the posts is highly desirable because it is permanent and reliable but soldering is not practical because the grouping of the terminal posts is too close to permit the application of a soldering iron. Moreover, soldering each individual wire is a slow and tedious operation and is not in keeping with modern assembly practice.

A primary object of the present invention has been to provide a compact connector arranged to be fastened to a lead wire and having a thimble member adapted to be slipped telescopically under pressure upon the end portion of a terminal post, the thimble adapted to receive a solder precoat whereby it may be fused permanently to the post quickly and conveniently by applying heat to it exteriorly.

In order to provide a fused joint, it is necessary for the thimble to fit snugly upon the post so that its internal bore embraces under pressure the periphery of the post. This requires that the connector be forced under pressure upon the post by pressing upon the shank which is joined to the outer end of the thimble. It is necessary therefore that the thimble be sufficiently strong circumferentially to resist the force of expansion as it is forced upon the post and it is also necessary that the shank be sufficiently resistant to bending to withstand the pressure imposed upon it as the thimble is forced in place.

By virtue of the pressure engagement, the connector may be slipped upon the post and the several connectors, usually three in number, may be rotated upon their posts relative to one another to a position of maximum clearance before fusing. It is then a simple matter to apply heat to the exterior of each connector, fusing it permanently in its adjusted position upon the post, thereby eliminating any possibility of axial or rotary displacement of the connectors after the compressor is placed in service. The fused solder connection also improves the electrical connection between the posts and connectors to insure maximum performance of the equipment.

Another object of the invention has been to produce from a single rolled sheet metal blank a strong, generally cylindrical thimble having alternate external and internal reversely curved bands forming collectively a cylindrical bore, the internal bands being reinforced by the external body of the thimble and extending across the seam of the rolled thimble. Upon being dipped into a liquified solder precoating bath, the internal bands are fused to the internal surface of the thimble on opposite sides of the joint and thereby impart additional radial strength to the thimble.

The staggered semi-circular transverse bands embrace the opposite sides of the post and provide a continuous pressure contact about the entire periphery of the post and an interrupted contact longitudinally of the post. The continuous circumferential contact insures a snug fit and intimate contact between the interfaces of the thimble and post and upon fusing, produces a sweated joint continuously about the periphery of the post and thimble. On the other hand, the longitudinally staggered relationship of the bands presents a series of transverse abutment edges rising from the periphery of the post which cooperate with the fused solder precoat to resist effectively the vibratory forces tending to dislodge the connector axially from the post.

A further object has been to provide a shank which is related at right angles to the axis of the thimble and connected to it by an integral metal section configurated to provide rigidity between the thimble and shank, the metal section also providing an abutment engageable with the outer end of the terminal post to limit the extent of engagement of the thimble upon the post. In completing the electrical connections to the post, the lead wire is first secured to the shank of the connector, then the thimble portion is slipped upon the post. The pressure of insertion is applied against the angular shank and the configurated connecting section imparts sufficient stiffness to prevent bending of the shank under such pressure and by its configuration, extends toward the axis of the thimble, thus functioning as a stop engageable with the end of the post to determine that proper longitudinal position of the connector upon the post.

The various features and advantages of the invention are disclosed in detail in the following description taken in conjunction with the accompanying drawings.

In the drawings:

Figure 1 is a face view of a conventional hermetic seal plug illustrating generally the mode of applying the present electrical connectors upon the terminal posts of the plug.

Figure 2 is an enlarged plan view of the connector before attaching the lead wire and inserting the connector upon the terminal post, illustrating the general construction and arrangement of the shank and thimble.

Figure 3 is a side view further illustrating the structural details of the connector and showing the connector inserted upon a terminal post.

Figure 4 is a cross sectional view taken on line 4—4, Figure 3 detailing the construction of the thimble member, particularly the arrangement of the internal and external bands relative to the terminal post.

Figure 5 is a cross section taken on line 5—5, Figure 3 further detailing the arrangement of the bands of the thimble.

Figure 6 is a longitudinal section taken on line 6—6, Figure 2 detailing the staggered arrangement of the bands and their alternate engagement about the periphery of the terminal post which is indicated in broken lines.

Figure 7 is a fragmentary sectional view of the thimble and a portion of the terminal post, showing the application of the solder precoat film upon the mating parts adapting the thimble to be fused permanently upon the post.

Figure 8 is a sectional view showing the connector installed and permanently fused to the post by the application of heat. In this view the electrical lead wire is shown welded to the shank of the connector with the shank clinched over upon the lead wire.

Figure 9 is a sectional view taken on line 9—9, Figure 8, further detailing the fused connection between the post and connector.

Figure 10 is a section taken on line 10—10, Figure 6, further illustrating the configuration of the connective metal section between the shank and thimble.

The connector consists essentially of a connector sleeve or thimble member indicated generally at 1 and an integral shank indicated at 2, the thimble member adapted to be slipped telescopically on the terminal post 3 of the hermetic seal plug 4, the shank adapted to provide a mechanical and electrical connection to the lead wire. The connectors are of one-piece stamped sheet metal construction, formed preferably of copper, beryllium-copper or similar sheet metal which possesses good electrical properties.

As shown in Figure 2, the shank portion 2 is generally U-shaped as viewed from the end before the lead wire is attached and clinched. In its illustrated form, the shank is related at right angles to the sleeve portion as viewed in Figure 3, being joined by a connecting portion which is stamped to provide a partially spherical metal section or dimple 5. The longitudinal curvature of the indented spherical section is best shown in Figure 6 and the transverse curvature is illustrated in Figure 10.

The transverse curvature forms a rigid corrugation capable of resisting the considerable bending force which is imposed upon the shank portion upon application of the connector to the post and thus prevents deformation of the connector. The configuration has the further function of providing a stop or abutment which engages the end of the post, as shown in Figures 6 and 8, to limit the extent of insertion of the sleeve portion upon the post. The abutment is necessary because the end of the thimble must not engage the insulating material which secures the terminal post to the hermetic seal plug.

It will be apparent therefore, that the spherical section 5 serves the double purpose of delineating the longitudinal position of the thimble as well as imparting stiffness to the connector. In addition, the compressor unit is subjected to a great deal of vibration which is transmitted from the terminal posts through the connector to the electrical lead wires. The spherical section, by its rigidity, resists the bending forces imparted by vibration and thereby prevents fatigue and crystallization of this relatively thin connecting section between the thimble and shank.

As shown in Figure 8, the lead wire indicated at 6 is readily attached to the shank portion by spot welding the exposed end of the wire directly to the shank as indicated at 7, then doubling the insulated portion of the wire upon the welded portion and clinching the shank over upon it to provide a strong mechanical connection. This arrangement is conventional in the art and does not form an essential part of this invention. In assembling the compressor units the lead wires are attached to the clips in this manner and the final operation consists of slipping the thimble portion upon the post and applying heat to the assembly to fuse the solder film.

The terminal posts 3 extend from both sides of the hermetic seal and the present connectors may be applied both to the inner and outer ends of the terminal post. The connectors are of particular advantage in providing the connection from the posts to the internal lead wires since they provide a strong reliable physical connection with the post and thereby eliminate the possibility of failure due to breakage of the connector or displacement of it with respect to the posts. It will be noted that the improved connector makes it unnecessary to groove the ends of the terminal post as was formerly necessary for engagement of the locking element of the connector. This is naturally a desirable feature since it reduces machining operations and lowers the cost of the hermetic seal plugs.

The connector is formed from a single blank of sheet metal which is configurated to provide the shank 2, the connecting section and the thimble 1. The thimble is formed by rolling this portion of the blank to form a generally cylindrical sleeve having an open forward end and having the shank joined to and extending from its rearward end. It will be observed that the sleeve so formed, ordinarily would lack the mechanical strength of a cylinder having a continuous wall since the longitudinal joint indicated at 8 can be sprung open under pressure.

In order to provide additional strength so that the thimble cannot be sprung open when forced upon the post and to provide a continuous internal bore for engagement about the post, the thimble is constituted by a row of internal and external bands which are transverse to the axis of the sleeve. The internal bands are indicated at 9 and the external bands, which are constituted by the intact wall section of the sleeve, are indicated at 10.

These bands collectively complement one another to provide a cylindrical bore which is continuous circumferentially and interrupted longitudinally, the edges of the bands providing abutments which increase the purchase of the sleeve with respect to the post to prevent its displacement. The internal bands 9 are severed transversely from the peripheral wall of the sleeve on the side opposite to the longitudinal joint 8 and their opposite ends are intact with the wall of the sleeve at diametrically opposite sides as indicated at 11 (Figure 4).

The intact ends 11 of the bands are doubled upon the sleeve and are bent to a semi-circular curvature residing upon the interior of the sleeve and extending at right angles across the longitudinal joint. The bands are thus in contact with the marginal portions of the sleeve on opposite sides of the joint as indicated at 12—12 and derive support from the marginal portions of the sleeve. Upon the application of the solder precoat film, the bands fuse to the sleeve and form continuous metal connecting sections extending across the joint to provide circumferential strength. It will be apparent that if the marginal portion 12 of the sleeve were omitted, the internal bands would readily become broken upon insertion of the thimble upon the post, particularly if a tight fit is provided or if the sleeve is not properly lined up with the post during insertion.

In the present disclosure, the thimble is provided with three external bands and two internal bands, but it will be apparent that the number of internal bands can be increased or reduced without changing he effectiveness of the connection.

After the connectors are formed, the thin solder precoat, indicated at 13 in Figure 7, is applied to the thimble, preferably by a hot dipping operation. A solder precoat, indicated at 14 is also applied to the terminal posts so that the soldered connection is conveniently provided by applying heat to the outside of the thimble after it is slipped upon the post. The solder precoat is rather thin, preferably being a film in the neighborhood of .002" to .005" in thickness. By reason of the hot dipping operation, the film covers all of the exposed surfaces of the thimble.

As best shown in Figure 9, the film penetrates the crevice between the internal bands and the internal surface of the sleeve as at 15 to bond the metal surfaces in permanent union as noted above. The film also covers the side edges of the bands and upon being fused to the post, this film unites with the film on the post and forms minute fillets indicated at 16 in Figure 8, increasing the purchase of the thimble upon the post. The thickness of the solder precoat film and fillets is exaggerated in the drawings for purposes of illustration.

It will be evident from the foregoing that the connector is highly resistant to being deformed during insertion upon the post and that the position of the thimble upon the post is accurately determined by the abutment 5. The relatively tight fit of the thimble upon the post maintains the thimble in positon by friction before it is fused and this allows it to be adjusted by rotating it to the desired position radially. It is then a simple manner to apply heat to the thimble to fuse it permanently in place. Upon fusing, the solder joint provides a strong mechanical bond and a highly conductive electrical contact extending around the entire periphery of the post.

Having described my invention, I claim:

1. An electrical connector adapted to be attached to a lead wire to provide a connection from the wire to a cylindrical terminal post, said connector comprising; a thimble member having a shank joined to one end thereof, the shank adapted to be attached to an end of the lead wire and the thimble member adapted to be slipped telescopically upon an end portion of the terminal post, the thimble member constituting a generally cylindrical sleeve having a cylindrical internal bore which is continuous circumferentially and interrupted longitudinally, the bore constituted by a row of alternate internal and external bands which are transverse to the axis of the sleeve and semi-circular in cross section facing one another, the internal semi-circular bands being severed transversely from the peripheral wall of the sleeve and having their opposite ends joined to the wall of the sleeve at diametrically opposite sides of the sleeve, the internal bands being engaged against the internal surface of the sleeve whereby the internal bands are reinforced by the sleeve and said internal and external bands complement one another in staggered relationship and are adapted to embrace snugly the entire periphery of the cylindrical terminal post when the thimble member is slipped thereon.

2. An electrical connector adapted to be attached to a lead wire to provide a connection from the wire to a cylindrical terminal post, said connector comprising a thimble member having an integral shank joined to one end thereof, the shank adapted to be attached to an end of the lead wire and the thimble member adapted to be slipped telescopically upon an end portion of the terminal post, the thimble member being formed from a strip of sheet metal which is rolled longitudinally to provide a generally cylindrical sleeve with the longitudinal side edges of the strip in contiguous relationship and forming a longitudinal joint along one side of the sleeve, the sleeve having a cylindrical internal bore which is constituted by a row of alternate internal and external bands which are transverse to the axis of the sleeve and semi-circular in cross section facing one another, the internal bands being severed transversely from the peripheral wall of the sleeve on the side opposite said longitudinal joint, the internal bands being bent inwardly and nested within the interior of the sleeve and being engaged against the internal surface of the sleeve, and extending at right angles across the longitudinal joint, the internal bands having their opposite ends integral with the wall of the sleeve at diametrically opposite sides thereof, the external bands being constituted by the intact wall of the sleeve which is interrupted longitudinally by transverse slots formed by the transversely severed internal bands, said internal and external bands complementing one another in staggered relationship and adapted to embrace snugly the entire periphery of the cylindrical terminal post when the thimble member is slipped thereon.

3. An electrical connector adapted to be attached to a lead wire to provide a connection from the wire to a cylindrical terminal post, said connector comprising; a thimble member having an open forward end and having an integral shank at the rearward end thereof, the shank adapted to be attached to an end of the lead wire and the thimble member adapted to be forced telescopically upon an end portion of the terminal post, the thimble member formed from a strip of sheet metal which is rolled longitudinally to provide a generally cylindrical sleeve with the longitudinal side edges of the strip in contiguous relationship to form a longitudinal joint along one side of the sleeve, the sleeve having a series of transverse internal bands severed from the peripheral wall on the side opposite said longitudinal joint, said internal bands being semi-circular in cross section in a direction reverse to the cylindrical wall from which they are struck, the severed internal bands thereby interrupting said cylindrical wall section and being engaged against the interior of the sleeve and spanning said longitudinal joint, the sleeve thereby providing an internal cylindrical bore which is defined by said internal bands on one side and the interrupted cylindrical wall section of the sleeve on the opposite side adapted to provide a longitudinally staggered engagement with respect to the terminal post, said integral shank being joined to the rearward edge of the interrupted cylindrical wall section by an integral connecting strip, said strip being configured to extend toward the longitudinal axis of the internal cylindrical bore to present an abutment engageable against the outer end of the terminal post to limit the extent of engagement of the thimble upon the post.

4. An electrical connector adapted to be attached to a lead wire to provide a connection from the wire to a cylindrical terminal post, said connector comprising; a thimble member having an open forward end and having an integral shank at the rearward end thereof, the shank adapted to be attached to an end of the lead wire and the thimble member adapted to be forced telescopically upon an end portion of the terminal post, the thimble member formed from a strip of sheet metal which is rolled longitudinally to provide a generally cylindrical sleeve with the longitudinal side edges of the strip in contiguous relationship to form a longitudinal joint along one side of the sleeve, the sleeve having a series of transverse internal bands severed from the peripheral wall on the side opposite said longitudinal joint, said internal bands being semi-circular in cross section in a direction reverse to the cylindrical wall from which they are struck, the severed internal bands thereby interrupting said cylindrical wall section and being engaged against the interior of the sleeve and spanning said longitudinal joint, the sleeve thereby providing an internal cylindrical bore which is defined by said internal bands on one side and the interrupted cylindrical wall section of the sleeve on the opposite side forming a longitudinally interrupted and circumferentially continuous passageway adapted to receive in snug engagement the end portion of the terminal post, said integral shank being disposed at an angle to the axis of the sleeve and being joined to the rearward edge of the interrupted cylindrical wall section by an integral connecting strip which is partially spherical and extended toward the longitudinal axis of the internal cylindrical bore presenting an abutment engageable against the outer end of the terminal post to limit the extent of engagement of the thimble upon the post, said partially spherical metal section by its configuration imparting rigidity to the connecting strip to resist bending of the shank under pressure applied against it in forcing the thimble upon the terminal post.

5. An electrical connector adapted to be fastened to a lead wire to provide a connection from the wire to a cylindrical post, said connector comprising; a thimble member having an open forward end and having a shank integral with the rearward end, the shank adapted to be fastened to an end of the lead wire and the thimble member adapted to be slipped telescopically upon the end portion of the terminal post, the thimble member being formed from a strip of sheet metal rolled longitudinally to provide a generally cylindrical sleeve with the longitudinal side edges of the strip in contiguous relation forming a longitudinal joint along one side of the sleeve, the sleeve having an internal band severed transversely from its peripheral wall, the internal band having its opposite ends integral with the wall at diametrically opposite sides of the sleeve, the band being semi-circular in cross section in a direction reversed from the cylindrical wall section from which it is severed and being engaged against the internal surface of the sleeve on opposite sides of the longitudinal joint, said internal band and the cylindrical wall portion of the sleeve providing a cylindrical bore adapted to engage the opposite sides of a cylindrical terminal post to provide a longitudinally interrupted and circumferentially continuous contact with the periphery of the post.

HARRY A. KNOLLMAN.

References Cited in the file of this patent

FOREIGN PATENTS

| Number | Country | Date |
| --- | --- | --- |
| 24,085 | Great Britain | Dec. 4, 1899 |
| 182,154 | Germany | Jan. 28, 1907 |